(12) United States Patent
Lei et al.

(10) Patent No.: US 9,401,148 B2
(45) Date of Patent: Jul. 26, 2016

(54) SPEAKER VERIFICATION USING NEURAL NETWORKS

(71) Applicant: Google Inc., Mountain View, CA (US)

(72) Inventors: Xin Lei, Sunnyvale, CA (US); Erik McDermott, San Francisco, CA (US); Ehsan Variani, Baltimore, MD (US); Ignacio L. Moreno, New York, NY (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/228,469

(22) Filed: Mar. 28, 2014

(65) Prior Publication Data

US 2015/0127336 A1    May 7, 2015

Related U.S. Application Data

(60) Provisional application No. 61/899,359, filed on Nov. 4, 2013.

(51) Int. Cl.
*G10L 17/00* (2013.01)
*G10L 17/18* (2013.01)

(52) U.S. Cl.
CPC ..................................... *G10L 17/18* (2013.01)

(58) Field of Classification Search
None
See application file for complete search history.

(56) References Cited

U.S. PATENT DOCUMENTS

| | | |
|---|---|---|
| 5,150,449 A | 9/1992 | Yoshida et al. |
| 5,542,006 A | 7/1996 | Shustorovich et al. |
| 5,600,753 A | 2/1997 | Iso |
| 6,397,179 B2 | 5/2002 | Crespo et al. |
| 7,844,466 B2 | 11/2010 | Roy |
| 8,965,112 B1 | 2/2015 | Ibarz et al. |
| 2012/0065976 A1 | 3/2012 | Deng et al. |
| 2013/0225128 A1 | 8/2013 | Gomar |
| 2013/0325473 A1* | 12/2013 | Larcher ................... G10L 17/10 704/249 |
| 2013/0343641 A1 | 12/2013 | Mnih et al. |
| 2014/0156575 A1 | 6/2014 | Sainath et al. |
| 2014/0372112 A1 | 12/2014 | Xue et al. |
| 2015/0066499 A1 | 3/2015 | Wang et al. |
| 2015/0100530 A1 | 4/2015 | Mnih et al. |

OTHER PUBLICATIONS

Finan, R. A., A. T. Sapeluk, and R. I. Damper. "Comparison of multilayer and radial basis function neural networks for text-dependent speaker recognition." Neural Networks, 1996., IEEE International Conference on. vol. 4. IEEE, 1996.*

Garimella, Sri, and Hynek Hermansky. "Factor analysis of autoassociative neural networks with application in speaker verification." IEEE transactions on neural networks and learning systems 24.4 (2013): 522-528. Publication Data: Jan. 17, 2013.*

(Continued)

*Primary Examiner* — Pierre-Louis Desir
*Assistant Examiner* — Jonathan Kim
(74) *Attorney, Agent, or Firm* — Fish & Richardson P.C.

(57) ABSTRACT

Methods, systems, and apparatus, including computer programs encoded on a computer storage medium, for inputting speech data that corresponds to a particular utterance to a neural network; determining an evaluation vector based on output at a hidden layer of the neural network; comparing the evaluation vector with a reference vector that corresponds to a past utterance of a particular speaker; and based on comparing the evaluation vector and the reference vector, determining whether the particular utterance was likely spoken by the particular speaker.

18 Claims, 9 Drawing Sheets

(56) References Cited

OTHER PUBLICATIONS

Vasilakakis, Vasileios, Sandro Cumani, and Pietro Laface. "Speaker recognition by means of deep belief networks." (2013). (Published Oct. 2013; Presented on Oct. 14-15, 2013).*

Dehak, Najim, et al. "Front-end factor analysis for speaker verification." Audio, Speech, and Language Processing, IEEE Transactions on 19.4 (2011): 788-798.*

Donahue, Jeff, et al. "Decaf: A deep convolutional activation feature for generic visual recognition." arXiv preprint arXiv:1310.1531 (2013).*

Lee, Honglak, et al. "Unsupervised feature learning for audio classification using convolutional deep belief networks." Advances in neural information processing systems. 2009.*

Salman, Ahmad, and Ke Chen. "Exploring speaker-specific characteristics with deep learning." Neural Networks (IJCNN), The 2011 International Joint Conference on. IEEE, 2011.*

Melin, Patricia. "Signature Recognition with a Hybrid Approach Combining Modular Neural Networks and Fuzzy Logic for Response Integration." Modular Neural Networks and Type-2 Fuzzy Systems for Pattern Recognition. Springer Berlin Heidelberg, 2012. 77-92.*

Reynolds et al., "Speaker Verification Using Adapted Gaussian Mixture Models," Digital Signal Processing 10, 19-41 (2000).

Kenny et al., "Joint Factor Analysis versus Eigenchannels in Speaker Recognition," IEEE Transactions on Audio, Speech, and Language Processing, 15: 1435-1447, 2007.

Kenny et al., "Speaker and session variability in GMM-based speaker verification," IEEE Transactions on Audio, Speech, and Language Processing, 15: 1448-1460, 2007.

Kenny et al., "A study of interspeaker variability in speaker verification," IEEE Transactions on Audio, Speech, and Language Processing, 16: 980-988, 2008.

Dehak et al., "Front-end factor analysis for speaker verification," IEEE Transactions on Audio, Speech, and Language Processing, 19: 788-798, 2011.

Hinton et al., "Deep neural networks for acoustic modeling in speech recognition," IEEE Signal Processing Magazine, 29:82-97, Nov. 2012.

Kenny, "Bayesian speaker verification with heavy-tailed priors," in Proc. Odyssey Speaker and Language Recognition Workshop, 2010, 10 pages.

Stafylakis et al., "Text-dependent speaker recognition using PLDA with uncertainty propagation," in Proc. Interspeech, 2013, 5 pages.

Aronowitz, "Text-dependent speaker verification using a small development set," in Proc. Odyssey Speaker and Language Recognition Workshop, 2012, 28 pages.

Larcher et al. "Phonetically-constrained PLDA modeling for text-dependent speaker verification with multiple short utterances," in Proc. ICASSP, May 26-31, 2013, 7673-7677.

Oglesby et al., "Optimisation of neural models for speaker identification," in Proc. ICASSP, Apr. 3-6, 1990, 1:261-264.

Bennani et al., "Connectionist approaches for automatic speaker recognition," in ESCA Workshop on Automatic Speaker Recognition, Identification and Verification, 1990, 265-268.

Yegnanarayana et al., "AANN: an alternative to GMM for pattern recognition," Neural Networks, 15(3):459-469, 2002.

Lee et al.,"Unsupervised feature learning for audio classification using convolutional deep belief networks," in NIPS, 2009, 1-9.

Stafylakis et al., "Preliminary investigation of Boltzmann machine classifiers for speaker recognition," in Proc. Odyssey Speaker and Language Recognition Workshop, 2012, 8 pages.

Goodfellow et al., "Maxout networks," in Proc. JMLR, 2013, 1319-1327.

Hinton et al., "Improving neural networks by preventing co-adaptation of feature detectors," in arXive preprint, 2012, 1-18.

Dahl et al., "Improving deep neural networks for LVCSR using rectified linear units and dropout," in Proc. ICASSP, 2013, 5 pages.

Dean et al., "Large scale distributed deep networks," in NIPS, 2012, 1232-1240.

Nair et al., "Rectified linear units improve restricted Boltzmann machines," in ICML, 2010, 8 pages.

Auckenthaler et al., "Score normalization for text-independent speaker verification systems," Digital Signal Processing, 10: 42-54, 2000.

Mohamed et al., "Deep Belief Networks for phone recognition," ICASSP, 2011, 1-9.

Kinnunen et al., "Real-time speaker identification and verification," IEEE Transactions on Audio, Speech and Language Processing, Jan. 1, 2006, 14(1):277-288.

Aronowitz et al., "New developments in voice biometrics for user Authentication," in Interspeech, Aug. 2011, pp. 17-20.

Coates and Ng, "The importance of encoding versus training with sparse coding and vector quantization," in Proceedings of the 28th International Conference on Machine Learning (ICML-11), Jun. 2011, pp. 921-928.

Hassibi et al., "Second order derivatives for network pruning: Optimal brain surgeon," in Advances in Neural Information Processing Systems 5, 1993, pp. 164-171.

Jarrett et al., "What is the best multi-stage architecture for object recognition?" in ICCV. IEEE, 2009, pp. 2146-2153.

LeCun et al., "Gradient-based learning applied to document recognition," Proceedings of the IEEE, vol. 86, No. 11, pp. 2278-2324, Nov. 1998.

LeCun et al., "Learning methods for generic object recognition with invariance to pose and lighting," in Computer Vision and Pattern Recognition, 2004. CVPR 2004. Proceedings of the 2004 IEEE Computer Society Conference on, vol. 2. IEEE, Jul. 2004, pp. II-97-II-104.

Lei et al., "Application of convolutional neural networks to language identification in noisy conditions," in Proc. Speaker Odyssey Workshop (submitted), 2014, 6 pages.

McLaren et al., "Application of convolutional neural networks to speaker recognition in noisy conditions," in $15^{th}$ Annual Conference of the International Speech Communication Association, Sep. 2014, pp. 686-690.

Pennlio, "Fully-connected, locally-connected and shared weights layer in neural networks," Peng's Blog, Apr. 11, 2014 [retrieved on Sep. 8, 2015]. Retrieved from the Internet: URL<https://pennlio.wordpress.com/?s=fully-connected%2C+locally-connected>, 4 pages.

Prabhavalkar et al., "Automatic gain control and multi-style training for robust small-footprint keyword spotting with deep neural networks," Acoustics, Speech and Signal Processing (ICASSP), 2015 IEEE International Conference on, Apr. 2015, pp. 4704-4708.

Sainath et al., "Deep convolutional neural networks for LVCSR," in Acoustics, Speech and Signal Processing (ICASSP), 2013 IEEE International Conference on. IEEE, 2013, pp. 8614-8618.

Schalkwyk et al., ""Your word is my command": Google search by voice: A case study," in Advances in Speech Recognition, Springer, Aug. 2010, pp. 61-90.

Unknown Author, "Unsupervised Feature Learning and Deep Learning Tutorial: Convolutional Neural Network," Stanford University, publically available before Jun. 12, 2015 [retrieved on Sep. 8, 2015]. Retrieved from the Internet: URL<http://ufldl.stanford.edu/tutorial/supervised/ConvolutionalNeuralNetwork/>, 2 pages.

Vanhoucke et al., "Improving the speed of neural networks on CPUs," in Deep Learning and Unsupervised Feature Learning Workshop, NIPS 2011, 2011; pp. 1-8.

Variani et al., "Deep neural networks for small footprint text-dependent speaker verification," in Acoustics, Speech and Signal Processing (ICASSP), 2014 IEEE International Conference on. IEEE, May 2014, pp. 4080-4084.

Yu et al., "Exploiting Sparseness in Deep Neural Networks for Large Vocabulary Speech Recognition," in ICASSP 2012. IEEE SPS, Mar. 2012, pp. 4409-4412.

* cited by examiner

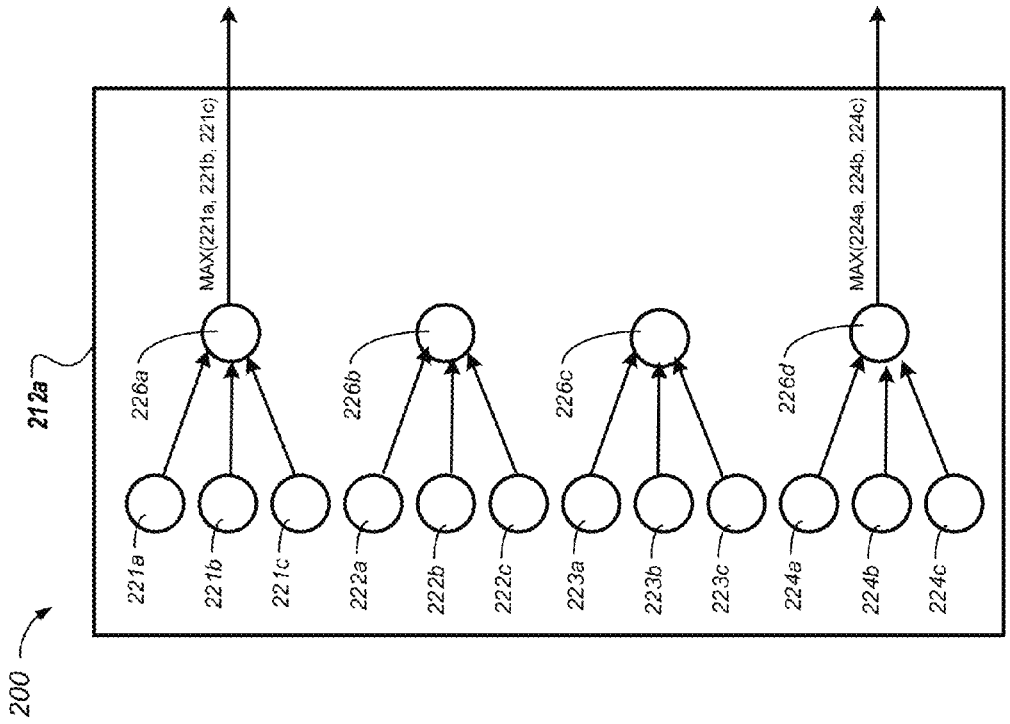
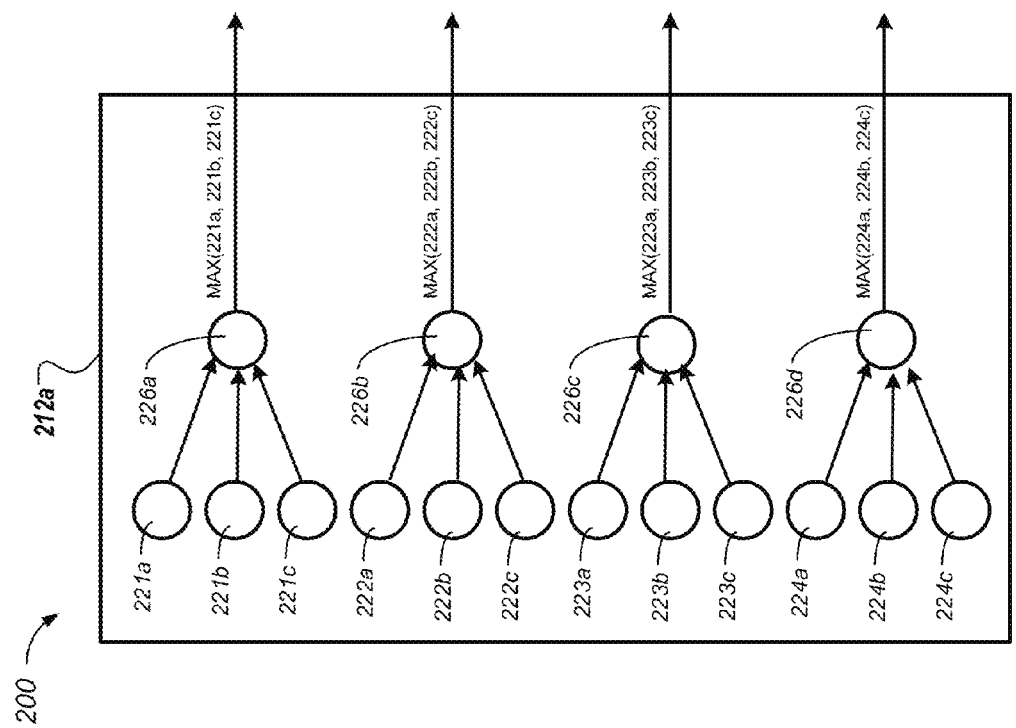

SPEAKER VERIFICATION USING NEURAL NETWORKS

CROSS-REFERENCE TO RELATED APPLICATIONS

This patent application claims the benefit of U.S. Provisional Patent Application No. 61/899,359, filed Nov. 4, 2013. The content of U.S. Provisional Patent Application No. 61/899,359 is hereby incorporated by reference into this application as if set forth herein in full.

TECHNICAL FIELD

This specification generally relates to speaker verification.

BACKGROUND

In some instances, it may be useful to verify a user's identify based on the user's voice. A user's identity may be verified using a speaker verification model that recognizes characteristics of the user's voice. In general, the speaker verification model may be stored at a mobile computing device or another computing device to enroll and to verify a user's identity through speech.

SUMMARY

According to one innovative aspect of the subject matter described in this specification, a speaker verification model based on a neural network may be trained using training utterances of a set of training speakers. The speaker verification model may be loaded onto a computing device. Such speaker verification model may be used to enroll and to verify an identify of a new user of the computing device without retraining the speaker verification model using speech features of the new user.

In general, one innovative aspect of the subject matter described in this specification can be embodied in methods that include the actions of inputting speech data that corresponds to a particular utterance to a neural network, determining an evaluation vector based on output at a hidden layer of the neural network, comparing the evaluation vector with a reference vector that corresponds to a past utterance of a particular speaker, and based on comparing the evaluation vector and the reference vector, determining whether the particular utterance was likely spoken by the particular speaker.

These and other implementations can each optionally include one or more of the following features. Comparing the evaluation vector with the reference vector may include determining a distance between the evaluation vector and the reference vector. Determining whether the particular utterance was spoken by the particular speaker may include determining whether the distance between the evaluation vector and the reference vector satisfies a threshold. Determining a distance between the evaluation vector and the reference vector may include computing a cosine distance between the evaluation vector and the reference vector.

Determining an evaluation vector based on output at a hidden layer of the neural network may include determining the evaluation vector based on activations at a last hidden layer of the neural network in response to inputting the speech data. The neural network may include multiple hidden layers. Determining an evaluation vector based on output at a hidden layer of the neural network may include determining the evaluation vector based on activations at a predetermined hidden layer of the multiple hidden layers in response to inputting the speech features.

The neural network may include multiple hidden layers that are trained using utterances of multiple speakers, where the multiple speakers do not include the particular speaker.

The features may include obtaining access to the neural network. For each of multiple utterances of the particular speaker, inputting speech data corresponding to the respective utterance to the neural network, and determining a vector for the respective utterance based on output of the hidden layer of the neural network, and combining the vectors for the respective utterances to obtain a reference vector of the particular speaker.

Advantageous implementations may include one or more of the following features. A new user may enroll in the speaker verification model without the need to retrain the speaker verification model using speech of the new user. The size of a speaker verification model is compact enough to be loaded to a mobile computing device. Parameters for training the neural network are flexible and configurable. The speaker verification model based on the trained neural network is configurable. A large number of training speakers may be used without increasing the size of the speaker verification model at runtime.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 3B is a block diagram of an example neural network layer that implements a maxout feature.

FIG. 3C is a block diagram of an example neural network layer that implements a dropout feature.

DETAILED DESCRIPTION

Figure 1:
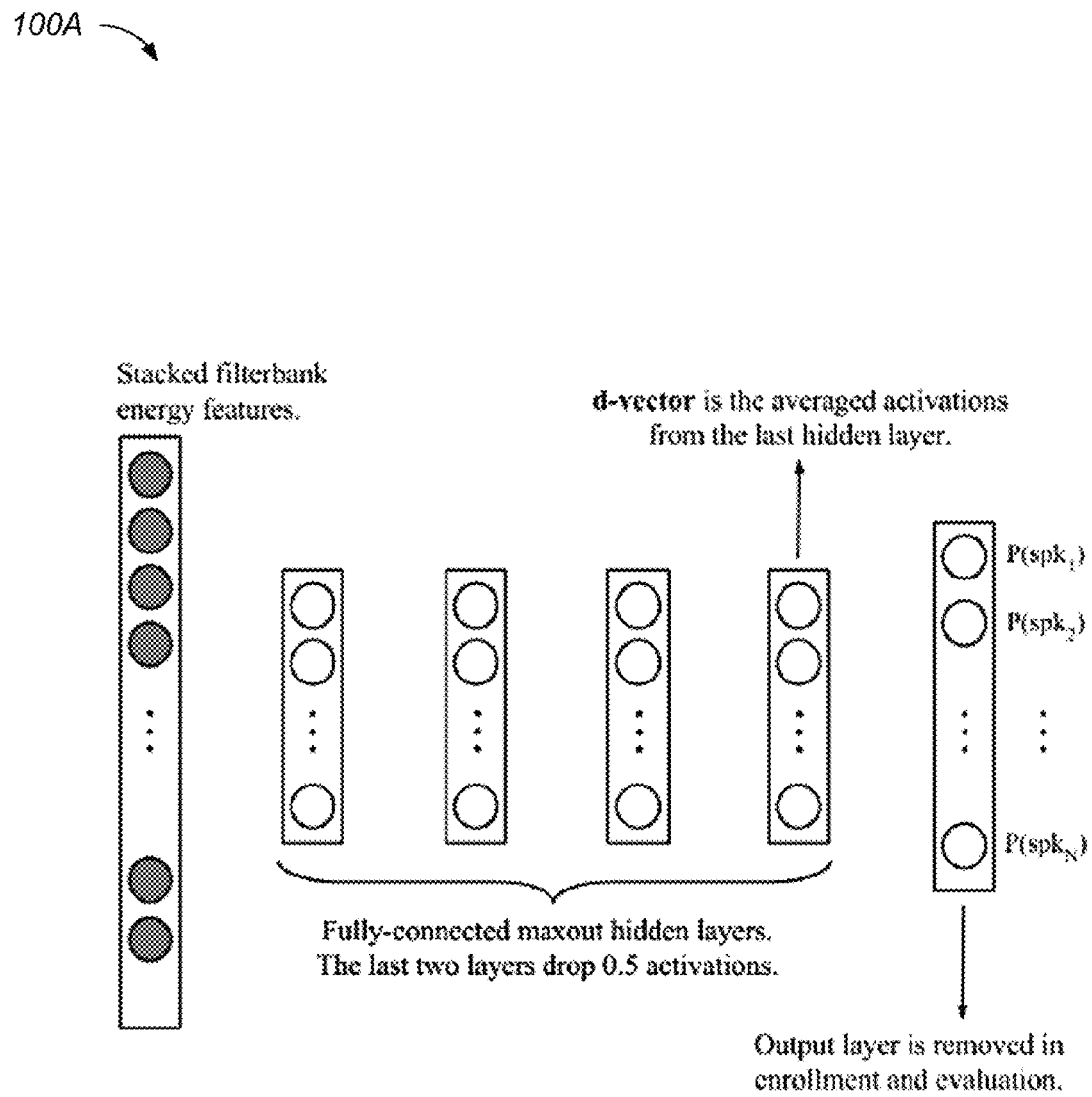
FIG. 1 is a block diagram of an example system that uses DNN model for speaker verification.

According to one innovative aspect of the subject matter described in this specification, deep neural networks (DNNs) may be used for a small footprint text-dependent speaker verification task. A DNN may be trained to classify training speakers at the frame-level. During speaker enrollment, the trained DNN may be used to extract speaker specific features from the last hidden layer. The average of these speaker features, or d-vector, may be taken as the speaker model. At runtime, a d-vector may be extracted for each utterance and compared to the enrolled speaker model to make a verification decision.

Speaker verification (SV) is the task of accepting or rejecting the identity claim of a speaker based on the information from his/her speech signal. Based on the text to be spoken, the SV systems can be classified into two categories, text-dependent and text-independent. Text-dependent SV systems require the speech to be produced from a fixed or prompted text phrase, while the text-independent SV systems operate on unconstrained speech. In some implementations, the SV systems may operate on a small footprint text-dependent SV task using fixed-text. In some other implementations, the SV system may operate on text-independent tasks.

In general, the SV process can be divided into three phases:

(1) Training background models. In some implementations, background models may be trained from a large collection of data to define the speaker manifold. Examples of background models include Gaussian mixture model (GMM) based Universal Background Models (UBMs) and Joint Factor Analysis (JFA) based models.

(2) Enrollment. In general, new speakers are enrolled by deriving speaker-specific information to obtain speaker-dependent models. In some implementations, new speakers may be assumed to not be in the background model training data.

(3) Evaluation. In some implementations, each test utterance is evaluated using the enrolled speaker models and background models. For example, a decision may be made on the identity claim.

A wide variety of SV systems have been studied using different statistical tools for each of the three phases in verification. Some SV systems use i-vectors and Probabilistic Linear Discriminant Analysis (PLDA). In these systems, JFA is used as a feature extractor to extract a low-dimensional i-vector as the compact representation of a speech utterance for SV.

To apply the powerful feature extraction capability of deep neural networks (DNNs) to speech recognition, a SV technique based on a DNN may be implemented as the speaker feature extractor. In some implementations, the DNN-based background model may be used to directly model the speaker space. For example, a DNN may be trained to map frame-level features in a given context to the corresponding speaker identity target. During enrollment, the speaker model may be computed as a deep vector ("d-vector"), the average of activations derived from the last DNN hidden layer. In the evaluation phase, decisions may be made using the distance between the target d-vector and the test d-vector. In some instances, DNNs used for SV can be integrated into other speech recognition systems by sharing the same DNN inference engine and simple filterbank energies frontend.

DNN for Speaker Verification

FIG. 1 is a block diagram of an example system 100A that uses DNN model for speaker verification. In general, neural networks are used to learn speaker specific features. In some implementations, supervised training may be performed.

DNN as a Feature Extractor

In general, a DNN architecture may be used as a speaker feature extractor. An abstract and compact representation of the speaker acoustic frames may be implemented using a DNN rather than a generative Factor Analysis model.

In some implementations, a supervised DNN, operating at the frame level, may be used to classify the training set speakers. For example, the input of this background network may be formed by stacking each training frame with its left and right context frames. The number of outputs may correspond to the number of speakers in the training set, N. The target labels may be formed as a 1-hot N-dimensional vector where the only non-zero component is the one corresponding to the speaker identity. FIG. 1 illustrates the DNN topology.

In some implementations, once the DNN has been trained successfully, the accumulated output activations of the last hidden layer may be used as a new speaker representation. For example, for every frame of a given utterance belonging to a new speaker, the output activations of the last hidden layer may be computed using standard feedforward propagation in the trained DNN, and then accumulate those activations to form a new compact representation of that speaker, the d-vector. By using the output from the last hidden layer instead of the softmax output layer the DNN model size for runtime may be reduced by pruning away the output layer, and a large number of training speakers may be used without increasing DNN size at runtime. In addition, using the output of the last hidden layer can enhance generalization to unseen speakers.

In some implementations, the trained DNN, having learned compact representations of the training set speakers in the output of the last hidden layer, may also be able to represent unseen speakers.

Enrollment and Evaluation

In some implementations, given a set of utterances $Xs=\{Os1, Os2, \ldots Osn\}$ from a speaker s, with observations $Osi=\{o1, o2, \ldots, om\}$, the process of enrollment may be described as follows. First, every observation oj in utterance Osi, together with its context, may be used to feed the supervised trained DNN. The output of the last hidden layer may then be obtained, L2 normalized, and accumulated for all the observations oj in Osi. The resulting accumulated vector may be referred to as the d-vector associated with the utterance Osi. The final representation of the speaker s may be derived by averaging all d-vectors corresponding for utterances in Xs.

In some implementations, during the evaluation phase, the normalized d-vector may be extracted from the test utterance. The cosine distance between the test d-vector and the claimed speaker's d-vector may then be computed. A verification decision may be made by comparing the distance to a threshold.

DNN Training Procedure

In some implementations, the background DNN may be trained as a maxout DNN using dropout. Dropout is a useful strategy to prevent over-fitting in DNN fine-tuning when using a small training set. In some implementations, the dropout training procedure may include randomly omitting certain hidden units for each training token. Maxout DNNs may be conceived to properly exploit dropout properties. Maxout networks differ from the standard multi-layer perceptron (MLP) in that hidden units at each layer are divided into non-overlapping groups. Each group may generate a single activation via the max pooling operation. Training of maxout networks can optimize the activation function for each unit.

As one example, a maxout DNN may be trained with four hidden layers and 256 nodes per layer, within the DistBelief framework. Alternatively, a different number of layers (e.g., 2, 3, 5, 8, etc.) or a different number of nodes per layer (e.g., 16, 32, 64, 128, 512, 1024, etc.) may be used. A pool size of 2 is used per layer, but the pool size used may be greater or fewer than this, e.g., 1, 3, 5, 10, etc.

In some implementations, dropout techniques are used at fewer than all of the hidden layers. For example, the initial hidden layers may not use dropout, but the final layers may use drop out. In the example of FIG. 1, the first two layers do not use dropout while the last two layers drop 50 percent of activations after dropout. As an alternative, at layers where dropout is used, the amount of activations dropped may be, for example, 10 percent, 25 percent, 40 percent, 60 percent, 80 percent, etc.

Rectified linear units may be used as the non-linear activation function on hidden units and a learning rate of 0.001 with exponential decay (0.1 every 5M steps). Alternatively, a different learning rate (e.g., 0.1, 0.01, 0.0001, etc.) or a different number of steps (e.g., 0.1M, 1M, 10M, etc.) may be used. The input of the DNN is formed by stacking the 40-dimensional log filterbank energy features extracted from a given frame, together with its context, 30 frames to the left and 10 frames to the right. The dimension of the training target vectors can be the same as the number of speakers in the training set. For example, if 500 speakers are in the training set, then the training target can have a dimension of 500. A different number of speakers can be used, e.g., 50, 100, 200, 750, 1000, etc. The final maxout DNN model contains about 600K parameters. Alternatively, final maxout DNN model may contain more or fewer parameters (e.g., 10 k, 100 k, 1M, etc.).

As discussed above, a DNN-based speaker verification method can be used for a small footprint text-dependent speaker verification task. DNNs may be trained to classify training speakers with frame-level acoustic features. The trained DNN may be used to extract speaker-specific features. The average of these speaker features, or d-vector, may be used for speaker verification.

In some implementations, a DNN-based technique and an i-vector-based technique can be used together to verify speaker identity. The d-vector system and the i-vector system can each generate a score indicating a likelihood that an utterance corresponds to an identity. The individual scores can be normalized, and the normalized scores may then be summed or otherwise combined to produce a combined score. A decision about the identity can then be made based on comparing the combined score to a threshold. In some instances, the combined use of an i-vector approach and a d-vector approach may outperform either approach used individually.

Figure 2:
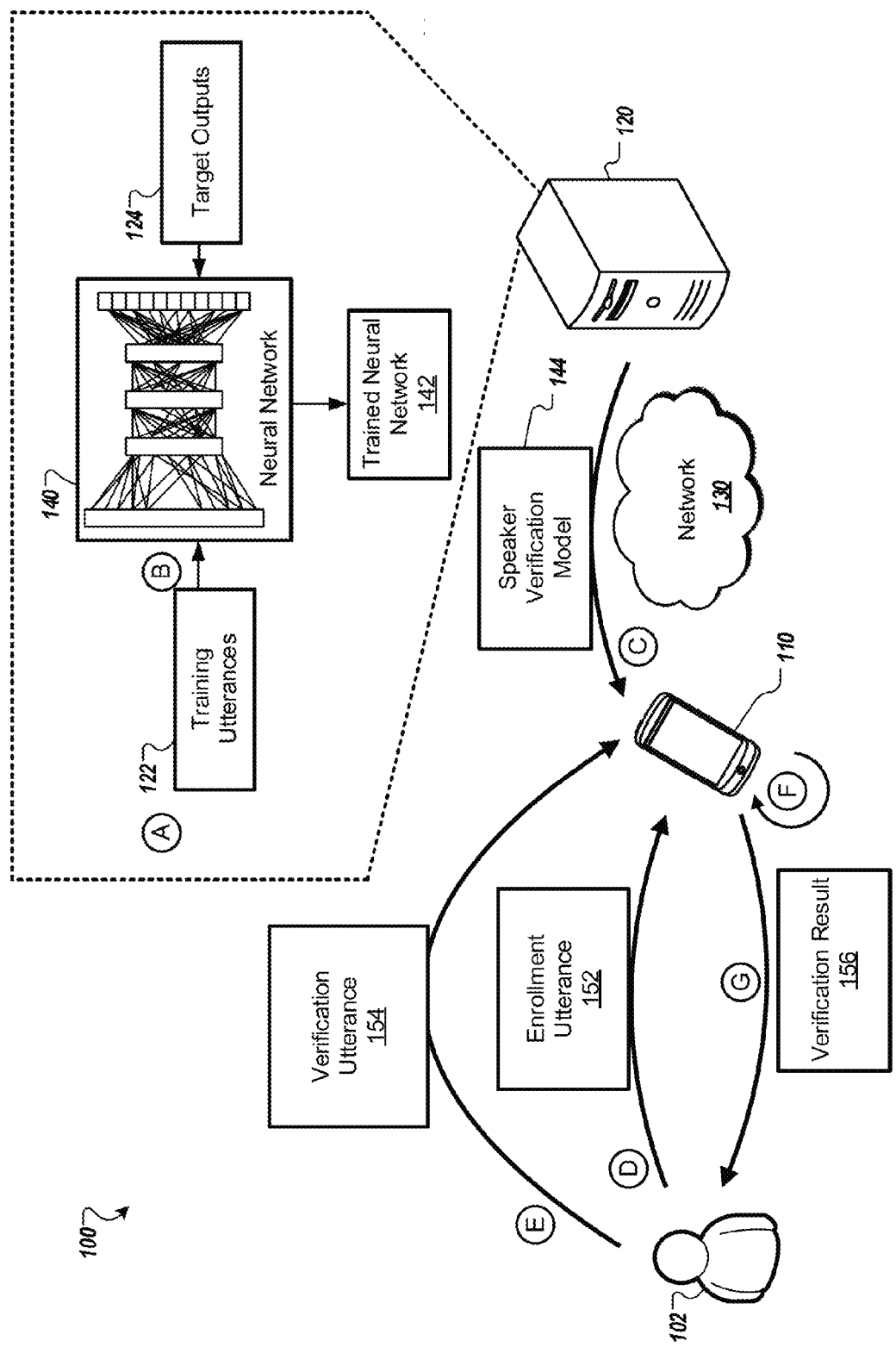
FIG. 2 is a block diagram of an example system that can verify a user's identity using a speaker verification model based on a neural network.

FIG. 2 is a block diagram of an example system 100 that can verify a user's identity using a speaker verification model based on a neural network. Briefly, a speaker verification process is the task of accepting or rejecting the identity claim of a speaker based on the information from his/her speech signal. In general, the speaker verification process includes three phases, (i) training of the speaker verification model, (ii) enrollment of a new speaker, and (iii) verification of the enrolled speaker.

The system 100 includes a client device 110, a computing system 120, and a network 130. In some implementations, the computing system 120 may provide a speaker verification model 144 based on a trained neural network 142 to the client device 110. The client device 110 may use the speaker verification model 144 to enroll the user 102 to the speaker verification process. When the identity of the user 102 needs to be verified at a later time, the client device 110 may receive speech utterance of the user 102 to verify the identity of the user 102 using the speaker verification model 144.

Although not shown in FIG. 2, in some other implementations, the computing system 120 may store the speaker verification model 144 based on the trained neural network 142. The client device 110 may communicate with the computing system 120 through the network 130 to use the speaker verification model 144 to enroll the user 102 to the speaker verification process. When the identity of the user 102 needs to be verified at a later time, the client device 110 may receive speech utterance of the user 102, and communicate with the computing system 120 through the network 130 to verify the identity of the user 102 using the speaker verification model 144.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the computing system 120 can be performed by individual computer systems or can be distributed across multiple computer systems. The network 130 can be wired or wireless or a combination of both and can include the Internet.

In some implementations, a client device 110, such as a phone of a user, may store a speaker verification model 144 locally on the client device 110, allowing the client device 110 to verify a user's identity without reaching out to a remote server (e.g., the computing system 120) for either the enrollment or the verification process, and therefore may save communications bandwidth and time. Moreover, in some implementations, when enrolling one or more new users, the speaker verification model 144 described here does not require any retraining of the speaker verification model 144 using the new users, which also is computationally efficient.

It is desirable that the size of the speaker verification model 144 be compact because the memory space on the client device 110 may be limited. As described below, the speaker verification model 144 is based on a trained neural network. The neural network may be trained using a large set of training data, and may generate a large amount of data at the output layer. However, the speaker verification model 144 may be constructed by selecting only certain layers of the neural network, which may result in a compact speaker verification model suitable for the client device 110.

FIG. 2 also illustrates an example flow of data, shown in stages (A) to (F). Stages (A) to (F) may occur in the illustrated sequence, or they may occur in a sequence that is different than in the illustrated sequence. In some implementations, one or more of the stages (A) to (F) may occur offline, where the computing system 120 may perform computations when the client device 110 is not connected to the network 130.

During stage (A), the computing system 120 obtains a set of training utterances 122, and inputs the set of training utterances 122 to a supervised neural network 140. In some implementations, the training utterances 122 may be one or more predetermined words spoken by the training speakers that were recorded and accessible by the computing system 120. Each training speaker may speak a predetermined utterance to a computing device, and the computing device may record an audio signal that includes the utterance. For example, each training speaker may be prompted to speak the training phrase "Hello Phone." In some implementations, each training speaker may be prompted to speak the same training phrase multiple times. The recorded audio signal of each training speaker may be transmitted to the computing system 120, and the computing system 120 may collect the recorded audio signals and select the set of training utterances 122. In other implementations, the various training utterances 122 may include utterances of different words.

During stage (B), the computing system 120 uses the training utterances 122 to train a neural network 140, resulting in a trained neural network 142. In some implementations, the neural network 140 is a supervised deep neural network.

During training, information about the training utterances 122 is provided as input to the neural network 140. Training targets 124, for example, different target vectors, are specified as the desired outputs that the neural network 140 should produce after training. For example, the utterances of each particular speaker may correspond to a particular target output vector. One or more parameters of the neural network 140 are adjusted during training to form a trained neural network 142.

For example, the neural network 140 may include an input layer for inputting information about the training utterances 122, several hidden layers for processing the training utterances 122, and an output layer for providing output. The weights or other parameters of one or more hidden layers may be adjusted so that the trained neural network produces the desired target vector corresponding to each training utterance 122. In some implementations, the desired set of target vectors may be a set of feature vectors, where each feature vector is orthogonal to other feature vectors in the set. For example, speech data for each different speaker from the set of training speakers may produce a distinct output vector at the output layer using the trained neural network.

The neural network that generates the desired set of speaker features may be designated as the trained neural network 142. In some implementations, the parameters of the supervised neural network 140 may be adjusted automatically by the computing system 120. In some other implementations, the parameters of the supervised neural network 140 may be adjusted manually by an operator of the computing system 120. The training phase of a neural network is described in more details below in descriptions of FIGS. 3A, 3B, 3C, and 4.

During stage (C), once the neural network has been trained, a speaker verification model 144 based on the trained neural network 142 is transmitted from the computing system 120 to the client device 110 through the network 130. In some implementations, the speaker verification model 144 may omit one or more layers of the neural network 142, so that the speaker verification model 144 includes only a portion of, or subset of, the trained neural network 142. For example, the speaker verification model 144 may include the input layer and the hidden layers of the trained neural network 142, and use the last hidden layer of the trained neural network 142 as the output layer of the speaker verification model 144. As another example, the speaker verification model 144 may include the input layer of the trained neural network 142, and the hidden layers that sequentially follow the input layer, up to a particular hidden layer that has been characterized to have a computation complexity exceeding a threshold.

During stage (D), a user 102 who desires to enroll her voice with the client device 110 provides one or more enrollment utterances 152 to the client device 110 in the enrollment phase. In general, the user 102 is not one of the training speakers that generated the set of training utterances 122. In some implementations, the user client device 110 may prompt the user 102 to speak an enrollment phrase that is the same phrase spoken by the set of training speakers. In some implementations, the client device 110 may prompt the user to speak the enrollment phrase several times, and record the spoken enrollment utterances as the enrollment utterances 152.

The client device 110 uses the enrollment utterances 152 to enroll the user 102 in a speaker verification system of the client device 110. In general, the enrollment of the user 102 is done without retraining the speaker verification model 144 or any other neural network. The same speaker verification model 144 may be used at many different client devices, and for enrolling many different speakers, without requiring changing the weight values of other parameters in a neural network. Because the speaker verification model 144 can be used to enroll any user without retraining a neural network, enrollment may be done at the client device 110 with limited processing requirements. In some implementations, information about the enrollment utterances 152 is input to the speaker verification model 144, and the speaker verification model 144 may output a reference vector corresponding to the user 102. The output of the speaker vector may represent characteristics of the user's voice. The client device 100 stores this reference vector for later use in verifying the voice of the user 102. The enrollment phase of a neural network is described in more details below in descriptions of FIGS. 5 and 6.

During stage (E), the user 102 attempts to gain access to the client device 110 using voice authentication. The user 102 provides a verification utterance 154 to the client device 110 in the verification phase. In some implementations, the verification utterance 154 is an utterance of the same phrase that was spoken as the enrollment utterance 152. The verification utterance 154 is used as input to the speaker verification model 144.

During stage (F), the client device 110 determines whether the user's voice is a match to the voice of the enrolled user. In some implementation, the speaker verification model 144 may output an evaluation vector that corresponds to the verification utterance 154. In some implementations, the client device 110 may compare the evaluation vector with the reference vector of the user 102 to determine whether the verification utterance 154 was spoken by the user 102. The verification phase of a neural network is described in more details below in FIGS. 7 and 8.

During stage (G), the client device 110 provides an indication that represents a verification result 156 to the user 102. In some implementations, if the client device 110 has accepted the identity of the user 102, the client device 110 may send the user 102 a visual or audio indication that the verification is successful. In some other implementations, if the client device 110 has accepted the identity of the user 102, the client device 110 may prompt the user 102 for a next input. For example, the client device 110 may output a message "Device enabled. Please enter your search" on the display. In some other implementations, if the client device 110 has accepted the identity of the user 102, the client device 110 may perform a subsequent action without waiting for further inputs from the user 102. For example, the user 102 may speak "Hello Phone, search the nearest coffee shop" to the client device 110 during the verification phase. The client device 110 may verify the identity of the user 102 using the verification phrase "Hello Phone." If the identity of the user 102 is accepted, the client device 110 may perform the search for the nearest coffee shop without asking the user 102 for further inputs.

In some implementations, if the client device 110 has rejected the identity of the user 102, the client device 110 may send the user 102 a visual or audio indication that the verification is rejected. In some implementations, if the client device 110 has rejected the identity of the user 102, the client device 110 may prompt the user 102 for another utterance attempt. In some implementations, if the number of attempts exceeds a threshold, the client device 110 may disallow the user 102 from further attempting to verify her identity.

Figure 3A:
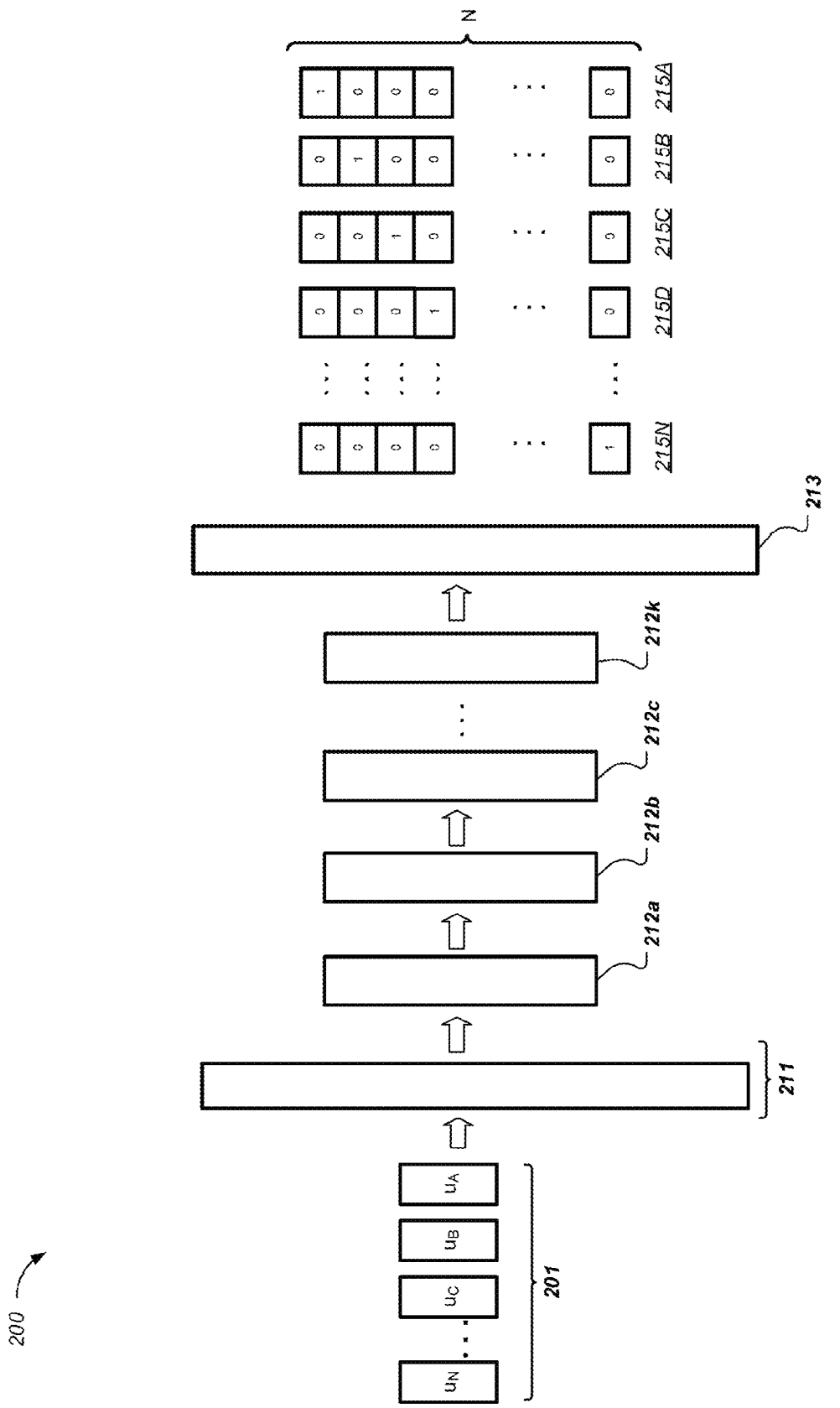
FIG. 3A is a block diagram of an example neural network for training a speaker verification model.

FIG. 3A is a block diagram of an example neural network 200 for training a speaker verification model. The neural network 200 includes an input layer 211, a number of hidden layers 212a-212k, and an output layer 213. The input layer 211 receives data about the training utterances. During training, one or more parameters of one or more hidden layers 212a-212k of the neural network are adjusted to form a trained neural network. For example, one or more hidden layers may be adjusted to obtain different target vectors corresponding to the different training utterances 122 until a desired set of target vectors are formed. In some implementations, the desired set of target vectors may be a set of feature vectors, where each feature vector is orthogonal to other feature vectors in the set. For example, for N training speakers, the neural network 200 may output N vectors, each vector corresponding to the speaker features of the one of the N training speakers.

A set of input vectors 201 for use in training is determined from sample utterances from multiple speakers. In the example, the value N represents the number of training speakers whose speech samples are used for training. The input vectors 201 are represented as $\{u_A, u_B, u_C, \ldots, u_N\}$. The input vector $u_A$ represents characteristics of an utterance of speaker A, the input vector $u_B$ represents characteristics of an utterance of speaker B, and so on. For each of the different training speakers, a corresponding target vector 215A-215N is assigned as a desired output of the neural network in response to input for that speaker. For example, the target vector 215A is assigned to Speaker A. When trained, the neural network should produce the target vector 215A in response to input that describes an utterance of Speaker A. Similarly, the target vector 215B is assigned to Speaker B, the target vector 215C is assigned to Speaker C, and so on.

In some implementations, training utterances may be processed to remove noises associated with the utterances before deriving the input vectors 201 from the utterances. In some implementations, each training speaker may have spoken several utterances of the same training phrase. For example, each training speaker may have been asked to speak the phrase "hello Google" ten times to form the training utterances. An input vector corresponding to each utterance, e.g., each instance of the spoken phrase, may be used during training. As an alternative, characteristics of multiple utterances may be reflected in a single input vector. The set of training utterances 201 are processed sequentially through hidden layers 212a, 212b, 212c, to 212k, and the output layer 213.

In some implementations, the neural network 200 may be trained under machine or human supervision to output N orthogonal vectors. For each input vector 201, the output at the output layer 213 may be compared to the appropriate target vector 215A-215N, and updates to the parameters of the hidden layers 212a-212k are made until the neural network produces the desired target output corresponding to the input at the input layer 211. For example, techniques such as backward propagation of errors, commonly referred to as backpropagation, may be used to train the neural network. Other techniques may additionally or alternatively be used. When training is complete, for example, the output vector 215A may be a 1-by-N vector having a value of [1, 0, 0, ..., 0], and corresponds to the speech features of utterance $u_A$. Similarly, the output vector 215B is another 1-by-N vector having a value of [0, 1, 0, ..., 0], and corresponds to the speech features of utterance $u_B$.

The hidden layers 212a-212k can have various different configurations, as described further with respect to FIGS. 3B and 3C below. For example, rectified linear units may be used as the non-linear activation function on hidden units and a learning rate of 0.001 with exponential decay (0.1 every 5M steps). Alternatively, a different learning rate (e.g., 0.1, 0.01, 0.0001, etc.) or a different number of steps (e.g., 0.1M, 1M, 10M, etc.) may be used.

In some implementations, once the neural network 200 is trained, a speech verification model may be obtained based on the neural network 200. In some implementations, the output layer 213 may be excluded from the speech verification model, which may reduce the size of the speech verification model or provide other benefits. For example, a speech verification model trained based on speech of 500 different training speakers may have a size of less than 1 MB.

FIG. 3B is a block diagram of an example neural network 200 having a hidden layer 212a that implements the maxout feature.

In some implementations, the neural network 200 may be trained as a maxout neural network. Maxout networks differ from the standard multi-layer perceptron (MLP) networks in that hidden units, e.g., nodes or neurons, at each layer are divided into non-overlapping groups. Each group may generate a single activation via the max pooling operation. For example, the hidden layer 212a shows four hidden nodes 226a-226d, with a pool size of three. Each of the nodes 221a, 221b, and 221c produces an output, but only the maximum of the three outputs is selected by node 226a to be the input to the next hidden layer. Similarly, each of the nodes 222a, 222b, and 222c produces an output, but only the maximum of the three outputs is selected by node 226b to be the input to the next hidden layer.

Alternatively, a different number of layers (e.g., 2, 3, 5, 8, etc.) or a different number of nodes per layer (e.g., 16, 32, 64, 128, 512, 1024, etc.) may be used. A pool size of 2 is used per layer, but the pool size used may be greater or fewer than this, e.g., 1, 3, 5, 10, etc.

FIG. 3C is a block diagram of an example neural network 200 having a hidden layer 212a that implements a maxout neural network feature using the dropout feature.

In some implementations, the neural network 200 may be trained as a maxout neural network using dropout. In general, dropout is a useful strategy to prevent over-fitting in neural network fine-tuning when using a small training set. In some implementations, the dropout training procedure may include randomly selecting certain hidden nodes of one or more hidden layers, such that output from these hidden nodes are not provided to the next hidden layer.

In some implementations, dropout techniques are used at fewer than all of the hidden layers. For example, the initial hidden layers may not use dropout, but the final layers may use drop out. As another example, the hidden layer 212a shows four hidden nodes 226a-226d, with a pool size of three, and a dropout rate of 50 percent. Each of the nodes 221a, 221b, and 221c produces an output, but only the maximum of the three outputs is selected by node 226a to be the input to the next hidden layer. Similarly, each of the nodes 222a, 222b, and 222c produces an output, but only the maximum of the three outputs is selected by node 226b to be the input to the next hidden layer. However, the hidden layer 212a drops 50 percent of activations as a result of dropout. Here, only the outputs of nodes 226a and 226d are selected as input for the next hidden layer, and the outputs of nodes 226b and 226c are dropped. As an alternative, at layers where dropout is used, the amount of activations dropped may be, for example, 10 percent, 25 percent, 40 percent, 60 percent, 80 percent, etc.

Figure 4:
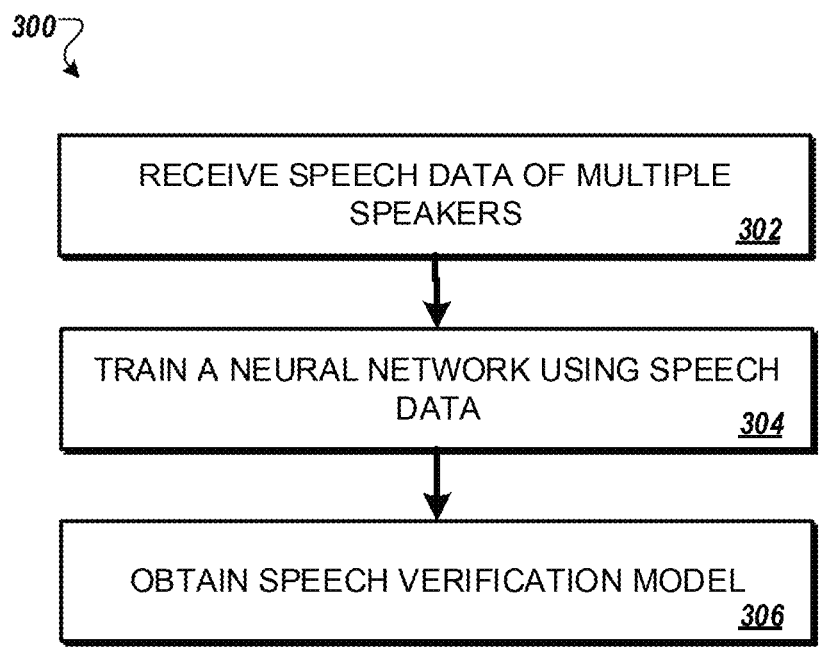
FIG. 4 is a flow chart illustrating an example process for training a speaker verification model.

FIG. 4 is a flow diagram that illustrates an example process 300 for training a speaker verification model. The process 300 may be performed by data processing apparatus, such as the computing system 120 described above or another data processing apparatus.

The system receives speech data corresponding to utterances of multiple different speakers (302). For example, the system may receive a set of training utterances. As another example, the system may receive feature scores that indicate one or more audio characteristics of the training utterances. As another example, using the training utterances, the system may determine feature scores that indicate one or more audio characteristics of the training utterances. In some implementations, the feature scores representing one or more audio characteristics of the training utterances may be used as input to a neural network.

The system trains a neural network using the speech data (304). In some implementations, the speech from each of the multiple different speakers may be designated as corresponding to a different output at an output layer of the neural network. In some implementations, the neural network may include multiple hidden layers.

In some implementations, training a neural network using the speech data may include a maxout feature, where for a particular hidden layer of the multiple hidden layers, the system compares output values generated by a predetermined number of nodes of the particular hidden layer, and outputs a maximum output value of the output values based on comparing the output values.

In some implementations, training a neural network using the speech data may include a dropout feature, where for a particular node of a particular hidden layer of the multiple hidden layers, the system determines whether to output an output value generated by the particular node based on a predetermined probability.

The system obtains a speech verification model based on the trained neural network (306). In some implementations, a number of layers of the speech verification model is fewer than a number of layers of the trained neural network. As a result, the output of the speech verification model is the outputs from a hidden layer of the trained neural network. For example, the speaker verification model may include the input layer and the hidden layers of the trained neural network, and use the last hidden layer of the trained neural network as the output layer of the speaker verification model. As another example, the speaker verification model may include the input layer of the trained neural network, and the hidden layers that sequentially follow the input layer, up to a particular hidden layer that has been characterized to have a computation complexity exceeding a threshold.

Figure 5:
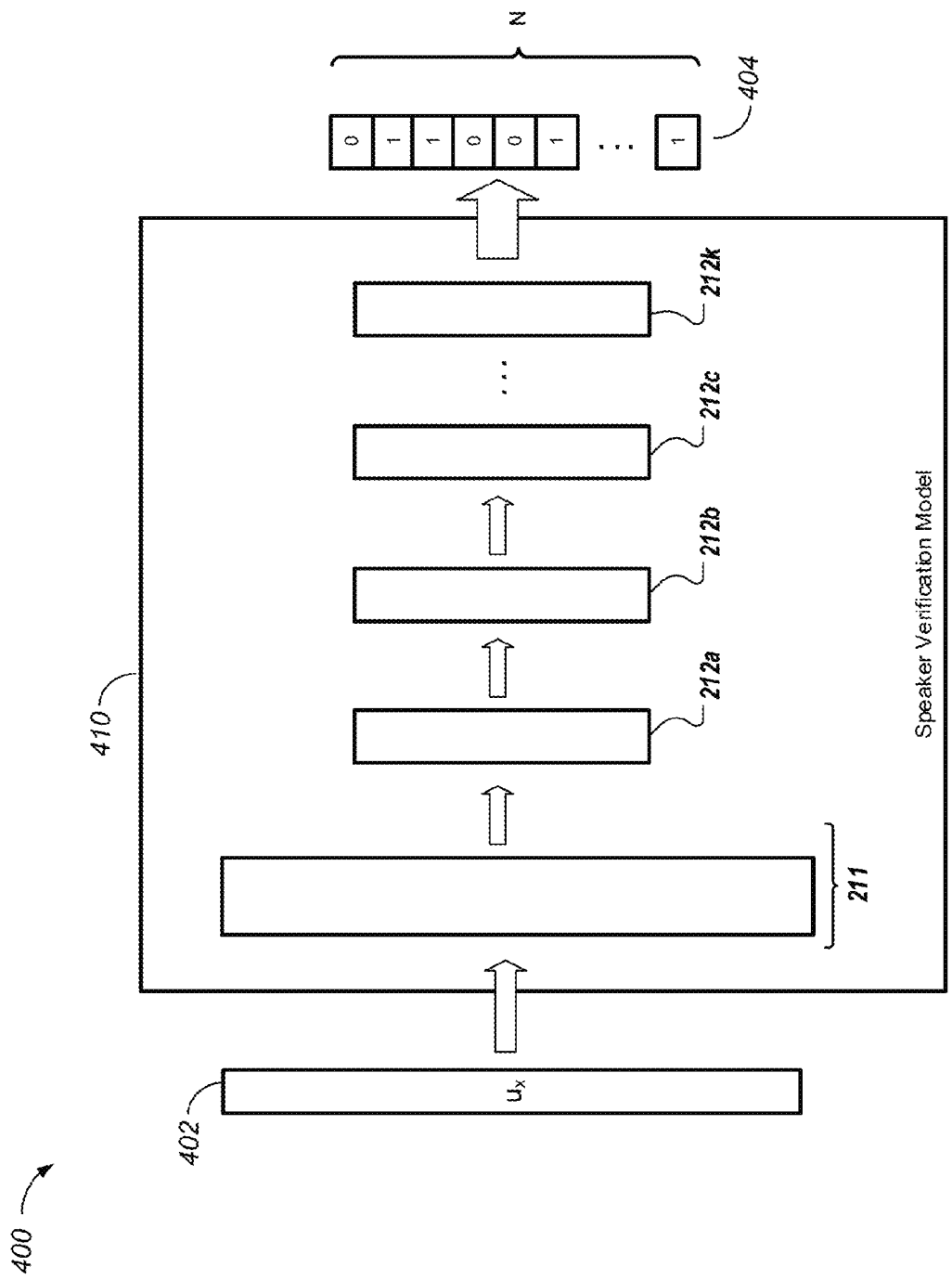
FIG. 5 is a block diagram of an example of using a speaker verification model to enroll a new user.

FIG. 5 is a block diagram of an example speaker verification model 400 for enrolling a new user. In general, the new user is not one of the training speakers that generated the set of training utterances. In some implementations, a user client device storing the speaker verification model 400 may prompt the new user to speak an enrollment phrase that is the same phrase spoken by the set of training speakers. Alternatively, a different phrase may be spoken. In some implementations, the client device may prompt the new user to speak the enrollment phrase several times, and record the spoken enrollment utterances as enrollment utterances. The output of the speaker verification model 400 may be determined for each of the enrollment utterances. The output of the speaker verification model 400 for each enrollment utterance may be accumulated, e.g., averaged or otherwise combined, to serve as a reference vector for the new user.

In general, given a set of utterances $X_s = \{O_{s1}, O_{s2}, \ldots O_{sn}\}$ from a speaker s, with observations $O_{si} = \{o_1, o_2, \ldots, o_m\}$, the process of enrollment may occur as follows. First, every observation $o_j$ in utterance $O_{si}$, together with its context, may be used to feed a speech verification model. In some implementations, the output of the last hidden layer may then be obtained, normalized, and accumulated for all the observations $o_j$ in $O_{si}$. The resulting accumulated vector may be referred to as a reference vector associated with the utterance $O_{si}$. In some implementations, the final representation of the speaker s may be derived by averaging all reference vectors corresponding for utterances in $X_s$.

For example, a speaker verification model 410 is obtained from the neural network 200 as described in FIG. 3A. The speaker verification model 410 includes the input layer 211, and hidden layers 212a-212k of the neural network 200. However, the speaker verification model 410 does not include the output layer 213. When speech features for an enrollment utterance 402 are input to the speaker verification model, the speaker verification model 410 uses the last hidden layer 212k to generate a vector 404.

In some implementations, the vector 404 is used as a reference vector, e.g., a voiceprint or unique identifier, that represents characteristics of the user's voice. In some implementations, multiple speech samples are obtained from the user, and a different output vector is obtained from the speaker verification model 410 for each of the multiple speech samples. The various vectors resulting from the different speech samples can be combined, e.g., averaged or otherwise accumulated, to form a reference vector. The reference vector can serve as a template or standard that can be used to identify the user. As discussed further below, outputs from the speaker verification model 410 can be compared with the reference vector to verify the user's identity.

Here, the reference vector 404 is a 1-by-N vector. The reference vector may have the same dimension as any one of the vectors 215A-215N, or may have a different dimension, since the reference vector 404 is obtained from layer 212k and not output layer 213 shown in FIG. 3A. The reference vector 404 has values of [0, 1, 1, 0, 0, 1 . . . , 1], which represent the particular characteristics of the user's voice. Note that the user speaking the enrollment utterance 402 is not included in the set of training speakers, and the speech verification model generates a unique reference vector 404 for the user without retraining the neural network 200.

In general, the completion of an enrollment process causes the reference vector 404 to be stored at the client device in association with a user identity. For example, if the user identity corresponds to an owner or authorized user of the client device that stores the speaker verification model 400, the reference vector 404 can be designated to represent characteristics of an authorized user's voice. In some other implementations, the speaker verification model 400 may store the reference vector 404 at a server, a centralized database, or other device.

Figure 6:
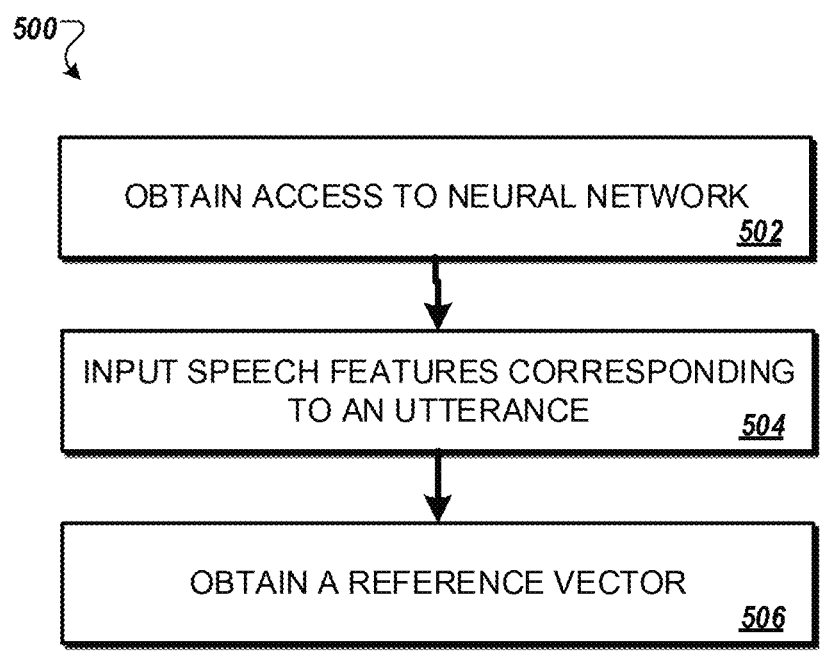
FIG. 6 is a flow chart illustrating an example process for enrolling a new speaker.

FIG. 6 is a flow diagram that illustrates an example process 500 for enrolling a new speaker using the speaker verification model. The process 500 may be performed by data processing apparatus, such as the client device 110 described above or another data processing apparatus.

The system obtains access to a neural network (502). In some implementations, the system may obtain access to a neural network that has been trained to provide an orthogonal vector for each of the training utterances. For example, a speaker verification model may be, or may be derived from, a neural network that has been trained to provide a distinct 1×N feature vector for each speaker in a set of N training speakers. The feature vectors for the different training speakers may be orthogonal to each other. A client device may obtain access to the speaker verification model by communicating with a server system that trained the speaker verification model. In some implementations, the client device may store the speaker verification model locally for enrollment and verification processes.

The system inputs speech features corresponding to an utterance (504). In some implementations, for each of multiple utterances of a particular speaker, the system may input speech data corresponding to the respective utterance to the neural network. For example, the system may prompt a user to speak multiple utterances. For each utterance, feature scores that indicate one or more audio characteristics of the utterance may be determined. The one or more audio characteristics of the training utterances may then be used as input to the neural network.

The system then obtains a reference vector (506). In some implementations, for each of multiple utterances of the particular speaker, the system determines a vector for the respective utterance based on output of a hidden layer of the neural network, and the system combines the vectors for the respective utterances to obtain a reference vector of the particular speaker. In some implementations, the reference vector is an average of the vectors for the respective utterances.

Figure 7:
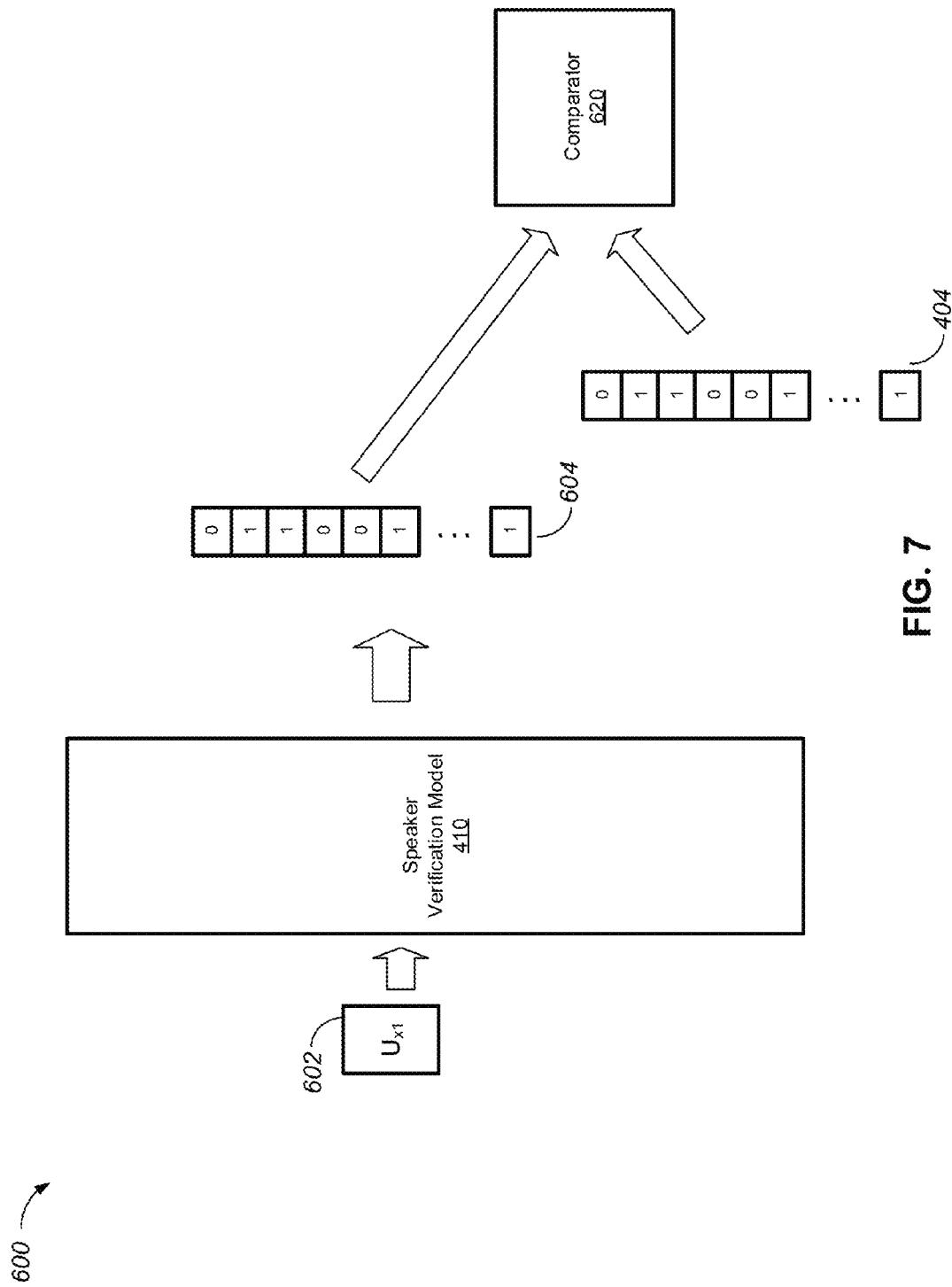
FIG. 7 is a block diagram of an example speaker verification model for verifying the identity of an enrolled user.

FIG. 7 is a block diagram of an example speaker verification model 600 for verifying the identity of an enrolled user. As discussed above, a neural network-based speaker verification method may be used for a small footprint text-dependent speaker verification task. As refers to in this Specification, a text-dependent speaker verification task refers to a computation task where a user speaks specific words or phrase that is predetermined. In other words, the input used for verification may be a predetermined word or phrase expected by the speaker verification model. The speaker verification model 600 may be based on a neural network trained to classify training speakers with distinctive feature vectors. The trained neural network may be used to extract one or more speaker-specific feature vectors from one or more utterances. The speaker-specific feature vectors may be used for speaker verification, for example, to verify the identity of a previously enrolled speaker.

For example, the enrolled user may verify her identity by speaking the verification utterance 602 to a client device. In some implementations, the client device may prompt the user to speak the verification utterance 602 using predetermined text. The client device may record the verification utterance 602. The client device may determine one or more feature scores that indicate one or more audio characteristics of the verification utterances 602. The client device may input the one or more feature scores in the speaker verification model 410. The speaker verification model 410 generates an evaluation vector 604. A comparator 620 compares the evaluation vector 604 to the reference vector 404 to verify the identity of the user. In some implementations, the comparator 620 may generate a score indicating a likelihood that an utterance corresponds to an identity, and the identity may be accepted if the score satisfies a threshold. If the score does not satisfy the threshold, the identity may be rejected.

In some implementations, a cosine distance between the reference vector 404 and the evaluation vector 604 may then be computed. A verification decision may be made by comparing the distance to a threshold. In some implementations, the comparator 620 may be implemented on the client device 110. In some other implementations, the comparator 620 may be implemented on the computing system 120. In some other implementations, the comparator 620 may be implemented on another computing device or computing devices.

In some implementations, the client device may store multiple reference vectors, with each reference vector corresponding to a respective user. Each reference vector is a distinct vector generated by the speaker verification model. In some implementations, the comparator 620 may compare the evaluation vector 604 with multiple reference vectors stored at the client device. The client device may determine an identity of the speaker based on the output of the comparator 620. For example, the client device may determine that the enrolled user corresponding to a reference vector that provides the shortest cosine distance to the evaluation vector 604 to be the identity of the speaker, if the shortest cosine distance satisfies a threshold value.

In some implementations, a neural network-based technique and an vector-based technique can be used together to verify speaker identity. The reference vector system and the vector system can each generate a score indicating a likelihood that an utterance corresponds to an identity. The individual scores can be normalized, and the normalized scores may then be summed or otherwise combined to produce a combined score. A decision about the identity can then be made based on comparing the combined score to a threshold. In some instances, the combined use of an vector approach and a reference-vector approach may outperform either approach used individually.

In some implementations, a client device stores a different reference vector for each of multiple user identities. The client device may store data indicating which reference vector corresponds to each user identity. When a user attempts to access the client device, output of the speaker verification model may be compared with the reference vector corresponding to the user identity claimed by the speaker. In some implementations, the output of the speaker verification model may be compared with reference vectors of multiple different users, to identify which user identity is most likely to correspond to the speaker or to determine if any of the user identities correspond to the speaker.

Figure 8:
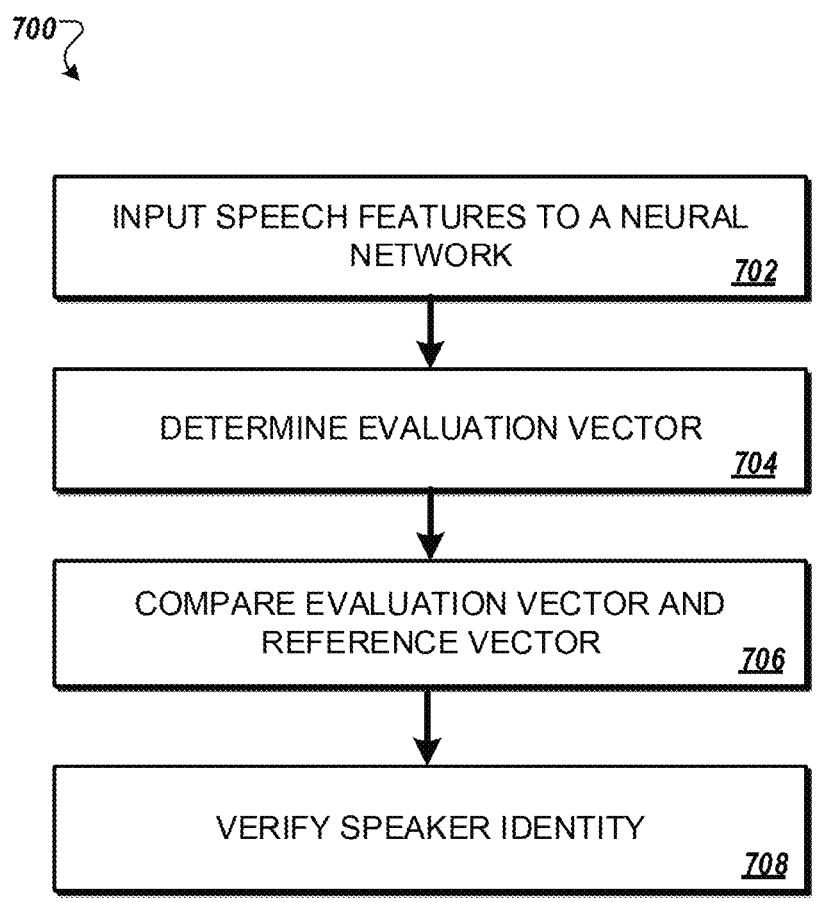
FIG. 8 is a flow chart illustrating an example process for verifying the identity of an enrolled user using a speaker verification model.

FIG. 8 is a flow diagram that illustrates an example process 700 for verifying the identity of an enrolled user using the speaker verification model. The process 700 may be performed by data processing apparatus, such as the client device 110 described above or another data processing apparatus.

The system inputs speech data that correspond to a particular utterance to a neural network (702). In some implementations, the neural network includes multiple hidden layers that are trained using utterances of multiple speakers, where the multiple speakers do not include the particular speaker.

The system determines an evaluation vector based on output at a hidden layer of the neural network (704). In some implementations, the system determines an evaluation vector based on output at a last hidden layer of a trained neural network. In some other implementations, the system determines an evaluation vector based on output at a hidden layer of a trained neural network that optimizes the computation efficiency of a speaker verification model.

The system compares the evaluation vector with a reference vector that corresponds to a past utterance of a particular speaker (706). In some implementations, the system compares the evaluation vector with the reference vector by determining a distance between the evaluation vector and the reference vector. For example, determining a distance between the evaluation vector and the reference vector may include computing a cosine distance between the evaluation vector and the reference vector.

The system verifies the identity of the particular speaker (708). In some implementations, based on comparing the evaluation vector and the reference vector, the system determines whether the particular utterance was spoken by the particular speaker. In some implementations, the system determines whether the particular utterance was spoken by the particular speaker by determining whether the distance between the evaluation vector and the reference vector satisfies a threshold. In some implementations, the system determines an evaluation vector based on output at a hidden layer of the neural network by determining the evaluation vector based on activations at a last hidden layer of the neural network in response to inputting the speech data.

In some implementations, the neural network includes multiple hidden layers, and the system determines an evaluation vector based on output at a hidden layer of the neural network by determining the evaluation vector based on activations at a predetermined hidden layer of the multiple hidden layers in response to inputting the speech features.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

The invention claimed is:

1. A method comprising:
inputting, by a computing device, speech data that corresponds to a particular utterance of a particular speaker to a neural network having parameters trained based on propagation between an input layer and an output layer through one or more hidden layers located between the input layer and the output layer, wherein the one or more hidden layers were trained using utterances of multiple speakers, and wherein the multiple speakers do not include the particular speaker;
generating, by the computing device and in response to inputting the speech data that corresponds to the particular utterance to the neural network, a representation of activations occurring at a particular layer of the neural network that was trained as one of the hidden layers located between the input layer and the output layer;
comparing, by the computing device, the generated representation of activations occurring at the particular layer of the neural network in response to the speech data that corresponds to the particular utterance with a reference representation of activations occurring at the particular layer of the neural network in response to speech data that corresponds to one or more past utterances of the particular speaker;
based on comparing the generated representation and the reference representation, determining, by the computing device, that the particular utterance was likely spoken by the particular speaker; and
providing, by the computing device, access to the computing device based on determining that the particular utterance was likely spoken by the particular speaker.

2. The method of claim 1,
wherein comparing, by the computing device, the generated representation with the reference representation comprises determining, by the computing device, a distance between the generated representation and the reference representation, and
wherein determining, by the computing device, that the particular utterance was spoken by the particular speaker comprises determining, by the computing device, that the distance between the generated representation and the reference representation satisfies a threshold.

3. The method of claim 2, wherein determining, by the computing device, a distance between the generated representation and the reference representation comprises computing, by the computing device, a cosine distance between the generated representation and the reference representation.

4. The method of claim 1, wherein generating, by the computing device and in response to inputting the speech data that corresponds to the particular utterance to the neural network, the representation of activations occurring at the particular layer of the neural network that was trained as one of the hidden layers located between the input layer and the output layer comprises generating, by the computing device and in response to inputting the speech data that corresponds to the particular utterance to the neural network, a representation of activations occurring at a particular layer of the neural network that was trained as one of the hidden layers located adjacent to the output layer.

5. The method of claim 1, wherein generating, by the computing device and in response to inputting the speech data that corresponds to the particular utterance to the neural network, the representation of activations occurring at the particular layer of the neural network that was trained as one of the hidden layers located between the input layer and the output layer comprises generating, by the computing device and in response to inputting the speech data that corresponds to the particular utterance to the neural network, the representation of activations occurring at a particular layer of the neural network that was trained as a predetermined one of the hidden layers located between the input layer and the output layer.

6. The method of claim 1, comprising:
obtaining, by the computing device access to the neural network;
for each of multiple utterances of the particular speaker:
inputting, by the computing device, speech data corresponding to the respective utterance to the neural network; and
generating, by the computing device, a representation of activations occurring at the particular layer of the neural network in response to the speech data corresponding to the respective utterance;
combining, by the computing device, the generated representations of activations occurring at the particular layer of the neural network in response to speech data corresponding to each of the multiple utterances of the particular speaker; and
using, by the computing device, the combination of generated representations of activations occurring at the particular layer of the neural network in response to speech data corresponding to each of the multiple utterances of the particular speaker as the reference representation.

7. The method of claim 1, further comprising dividing, by the computing device, the speech data corresponding to the particular utterance into frames; and
wherein generating, by the computing device and in response to inputting the speech data that corresponds to the particular utterance to the neural network, the representation of activations occurring at the particular layer of the neural network comprises:
  determining, by the computing device and for each of multiple different frames of the speech data, a corresponding set of activations occurring at the particular layer of the neural network based on the frame; and
  generating, by the computing device, the representation of the activations occurring at the particular layer by averaging the sets of activations that respectively correspond to the multiple different frames.

8. The method of claim 1, wherein generating, by the computing device and in response to inputting the speech data that corresponds to the particular utterance to the neural network, the representation of activations occurring at the particular layer of the neural network comprises:
  generating, by the computing device, the representation of activations occurring at the particular layer of the neural network (i) in response to inputting the speech data that corresponds to the particular utterance of the neural network, and (ii) irrespective of any activations occurring downstream from the particular layer in response to inputting the speech data that corresponds to the particular utterance of the neural network.

9. The method of claim 8, wherein inputting, by the computing device, speech data that corresponds to the particular utterance to the neural network having parameters trained based on propagation between the input layer and the output layer through one or more hidden layers located between the input layer and the output layer comprises:
  inputting, by the computing device, speech data that corresponds to the particular utterance to a neural network whose layers have been trained based on activations occurring at the output layer.

10. The method of claim 1, wherein the representation of the activations at the particular layer is a vector that indicates the activations at the particular layer.

11. The method of claim 1, wherein the input layer, the output layer, and the one or more hidden layers are included in a trained neural network;
  wherein inputting the speech data comprises inputting the speech data to a neural network that includes a subset of the layers of the trained neural network and excludes the output layer of the trained neural network used during training of the trained neural network; and
  wherein generating the representation comprises generating the representation of activations of a particular layer of the neural network that includes the subset of the layers of the trained neural network and excludes the output layer of the trained neural network.

12. The method of claim 1, wherein inputting the speech data comprises inputting the speech data to a neural network having parameters determined through supervised training of a first neural network including the input layer, the output layer, and the one or more hidden layers; and
  wherein generating the representation of activations comprises generating the representation of activations occurring at a particular layer of the neural network having parameters determined through supervised training of the first neural network.

13. The method of claim 1, wherein inputting the speech data comprises inputting the speech data to a neural network having parameters determined through training of a first neural network including the input layer, the output layer, and the one or more hidden layers using predetermined output targets for outputs at the output layer that correspond to different training inputs; and wherein generating the representation of activations comprises generating the representation of activations occurring at a particular layer of the neural network having parameters determined through training of the first neural network using predetermined output targets for outputs at the output layer that correspond to different training inputs.

14. The method of claim 1,
  wherein the computing device is a mobile phone on which data for the neural network is stored, and
  wherein the method comprises processing, by the mobile phone, propagation of data through the neural network to determine the activations at the particular layer in response to inputting the speech data to the neural network.

15. A non-transitory computer-readable medium storing software having stored thereon instructions, which, when executed by one or more computers, cause the one or more computers to perform operations of:
  inputting, by a computing device, speech data that corresponds to a particular utterance of a particular speaker to a neural network having parameters trained based on propagation between an input layer and an output layer through one or more hidden layers located between the input layer and the output layer, wherein the one or more hidden layers were trained using utterances of multiple speakers, and wherein the multiple speakers do not include the particular speaker;
  generating, by the computing device and in response to inputting the speech data that corresponds to the particular utterance to the neural network, a representation of activations occurring at a particular layer of the neural network that was trained as one of the hidden layers located between the input layer and the output layer;
  comparing, by the computing device, the generated representation of activations occurring at the particular layer of the neural network in response to the speech data that corresponds to the particular utterance with a reference representation of activations occurring at the particular layer of the neural network in response to speech data that corresponds to one or more past utterances of the particular speaker;
  based on comparing the generated representation and the reference representation, determining, by the computing device, that the particular utterance was likely spoken by the particular speaker; and
  providing, by the computing device, access to the computing device based on determining that the particular utterance was likely spoken by the particular speaker.

16. The non-transitory computer-readable medium of claim 15,
  wherein comparing, by the computing device, the generated representation with the reference representation comprises determining, by the computing device, a distance between the generated representation and the reference representation, and
  wherein determining, by the computing device, that the particular utterance was spoken by the particular speaker comprises determining, by the computing device, that the distance between the generated representation and the reference representation satisfies a threshold.

17. The non-transitory computer-readable medium of claim 15, wherein the operations comprise:
  obtaining, by the computing device access to the neural network;
  for each of multiple utterances of the particular speaker:

inputting, by the computing device, speech data corresponding to the respective utterance to the neural network; and generating, by the computing device, a representation of activations occurring at the particular layer of the neural network in response to the speech data corresponding to the respective utterance;

combining, by the computing device, the generated representations of activations occurring at the particular layer of the neural network in response to speech data corresponding to each of the multiple utterances of the particular speaker; and using, by the computing device, the combination of generated representations of activations occurring at the particular layer of the neural network in response to speech data corresponding to each of the multiple utterances of the particular speaker as the reference representation.

18. A system comprising:

one or more processors and one or more computer storage media storing instructions that are operable, when executed by the one or more processors, to cause the one or more processors to perform operations comprising:

inputting, by a computing device, speech data that corresponds to a particular utterance of a particular speaker to a neural network having parameters trained based on propagation between an input layer and an output layer through one or more hidden layers located between the input layer and the output layer, wherein the one or more hidden layers were trained using utterances of multiple speakers, and wherein the multiple speakers do not include the particular speaker;

generating, by the computing device and in response to inputting the speech data that corresponds to the particular utterance to the neural network, a representation of activations occurring at a particular layer of the neural network that was trained as one of the hidden layers located between the input layer and the output layer;

comparing, by the computing device, the generated representation of activations occurring at the particular layer of the neural network in response to the speech data that corresponds to the particular utterance with a reference representation of activations occurring at the particular layer of the neural network in response to speech data that corresponds to one or more past utterances of the particular speaker;

based on comparing the generated representation and the reference representation, determining, by the computing device, that the particular utterance was likely spoken by the particular speaker; and providing, by the computing device, access to the computing device based on determining that the particular utterance was likely spoken by the particular speaker.

* * * * *